Dec. 7, 1943.  A. P. McKAY  2,336,410
AGRICULTURAL IMPLEMENT
Original Filed May 26, 1941  2 Sheets-Sheet 1

INVENTOR
Augusta P. McKay.
BY
Lancaster, Allwine & Rommel
ATTORNEYS

Dec. 7, 1943.    A. P. McKAY    2,336,410
AGRICULTURAL IMPLEMENT
Original Filed May 26, 1941    2 Sheets-Sheet 2

INVENTOR
Augusta P. McKay.
BY
Lancaster, Allwine & Rommel
ATTORNEY

Patented Dec. 7, 1943

2,336,410

UNITED STATES PATENT OFFICE 2,336,410

AGRICULTURAL IMPLEMENT

Augusta Postelle McKay, Cedartown, Ga., assignor to Rome Plow Company, Cedartown, Ga., a corporation Original application May 26, 1941, Serial No. 395,258. Divided and this application April 6, 1942, Serial No. 437,875

7 Claims. (Cl. 97—50)

This invention relates to improvements in means for connecting and operating agricultural implements in connection with tractors.

The present application is a division out of application Serial Number 395,258, filed May 26, 1941.

The present invention relates to an improved agricultural implement, such as a harrow, which is particularly well adapted for connection to a light tractor, so that normally the implement will operate flexibly and freely upon the ground or material for which it is intended. The lifting mechanism of the improved implement is associated with the tractor so as to enable the implement to be entirely suspended upon the tractor, such as when it is desired to transport the implement or make a short turn with the tractor.

Other objects and advantages of this invention will be apparent during the course of the following detailed description.

In the drawings, wherein similar reference characters designate corresponding parts thruout the several views, Figure 1 is a side elevation of an implement, such as a suspension type of disc harrow operatively connected with a light duty type tractor.

Figure 3:
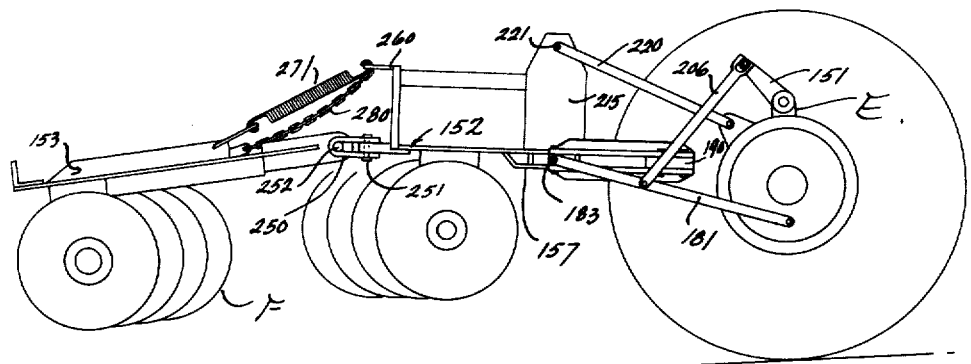
Figure 3 is a view similar to Figure 1, but with the power take-off and lift mechanism of the tractor operatively supporting the implement above a ground surface.
Figure 4:
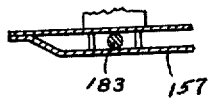
Figure 4 is a cross sectional view showing the association of the draw bar of the agricultural implement with a cross bar of the draft mechanism.

In the drawings, wherein for the purpose of illustration is shown a preferred embodiment of the improved implement, the letter $A^1$ may designate the light duty type of tractor, or any other type if desired. It has associated therewith a power take-off mechanism E. The agricultural implement F may be of the double cutting disc harrow type. It has associated therewith an improved draw bar or draft connecting means G. Lifting mechanism H is associated with the power take-off of the tractor $A^1$ for lifting the implement F into a suspended position such as shown in Figure 3. Improved means K is provided between the two sections of the harrow or implement F for operatively connecting the same for suspension purposes.

The power take-off E is provided with a shaft 150 having lift arms 151 of well known construction.

Figure 1:
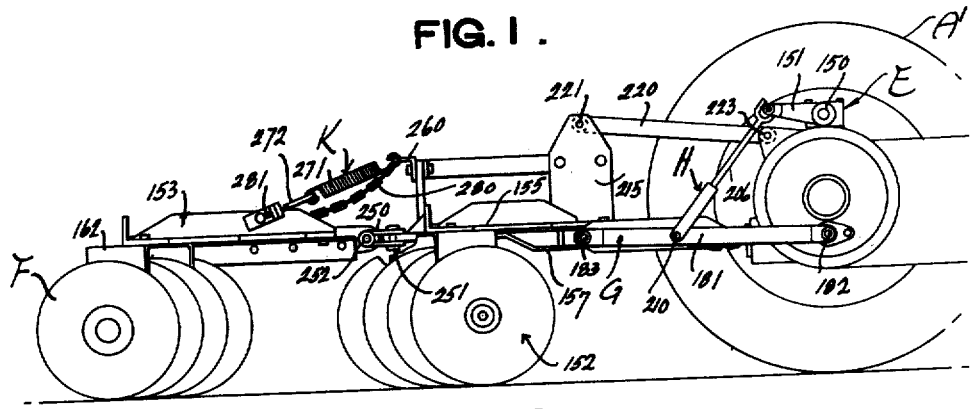

The implement F includes front and rear sections 152 and 153. The front section 152 is provided with disc supporting gangs 154 and 155 mounted upon a suitable frame 156. This front section also includes a central longitudinally extending draw bar 157 which at its fore portion is divided into upper and lower plates, as shown in Figure 1. The draw bar 157 is relatively broad for a purpose to be subsequently described.

The rear section 153 includes a frame or beam 160 having disc supporting gangs 161 and 162. The rear section also has a longitudinally extending draw bar 163; the forward end of which is connected by means of angle braces 165 with the frame or beam 160. These angle braces extend rearwardly in divergent relation.

Referring to the improved draft connection G, I provide draw bars 180 and 181 pivotally connected at points 182 at their forward ends to the axle housing of the tractor. They extend rearwardly, slightly divergent with respect to each other, and at their rear ends are provided with a cross bar 183. This cross bar 183 between the points of connections of the draw bars 180 and 181 is provided with rigidly attached angle pieces 185 and 186, in pairs, which extend convergently forward. At their front ends they rigidly support a pull plate 190. This pull plate 190 receives a vertically disposed coupling pin 191 to which the front end of the draw bar 157 of the implement F is pivotally attached. As before mentioned, the front end of the coupling 157 is constructed of upper and lower plate sections. The cross bar 183 is disposed between these sections in a transverse sliding but otherwise snug non-tilting relation.

The lever arms 151 of the power take-off E are provided with longitudinally adjustable lift bars 205 and 206; the same having a universal pivot connection with the levers 151 and at their lower ends being pivotally connected as at 210 with the draw bars 180 and 181, intermediate the ends of the latter. It will be understood that raising of the levers 151 pulls the draw bars 180 and 181 upwardly and lifts the implement F in a manner to be subsequently detailed.

The front section 152 of the implement F is provided with an upstanding member or standard 215, at the front end thereof, immediately above the cross bar 183, to which is pivotally connected a brace bar or member 220, at 221. The bar 220 is connected at 223 with the rear end of the tractor frame. These connections 221 and 223 are above the draw bars 180 and 181 so that the front section of the harrow or implement F will be lifted in a horizontal plane when the lift mechanism is operated.

Referring to the connections of the front and rear sections of the implement F, a coupling 250 is provided which has a vertical pivot axis connection at 251 with the rear end of the draw bar of the front section 152 and a horizontal axis connection at 252 with the front end of the draw bar of the rear section.

The means K includes a cross piece 260 upon the frame of the front section 152 at a location higher than any point of the rear section frame work, and at each side of the longitudinal central axis of the implement springs 270 and 271 are connected with this cross piece 260. By means of adjustable bolts 272, these springs 270 and 271 are connected with the angle braces 162 at each side of the longitudinal axis of the implement. The springs 270 and 271 diverge rearwardly for the purpose of insuring proper alignment of the rear section as it is lifted into suspended position. I prefer also to provide a normally slack chain 280, located along the longitudinal center of the implement, connected at one end to the bar 260 and at the other end to a point 281 upon the frame work of the rear section. This chain is very slack during operation of the implement and even when the implement is in suspended position. It only operates to prevent excessive vibration of the rear section and prevent rupture of the springs 270 and 271 should the strain upon the springs be too great because of passing of the tractor over irregular ground surfaces, etc.

The operation of the implement as it is drawn by the tractor will be apparent from the foregoing. The two sections of the implement F are entirely flexible and may move bodily upwardly or downwardly with respect to each other and tilt angularly with respect to each other, due to the universal type of coupling connection between them. The entire implement and especially the front section may pivotally move upwardly, downwardly and sideways with respect to the tractor.

As the lifting arms 151 pull the draw bars 180 and 181 upwardly, it can readily be understood that this will lift the cross bar 183, and due to the brace bar 220 above described, the front section will be lifted in substantially a horizontal position. It will not tilt sidewise due to the close fitting connection of the upper and lower portions of the draw bar 157 upon the cross bar 183. In this connection, note that the draw bar 157 is very wide and will prevent this tilting of the front section.

Figure 2:
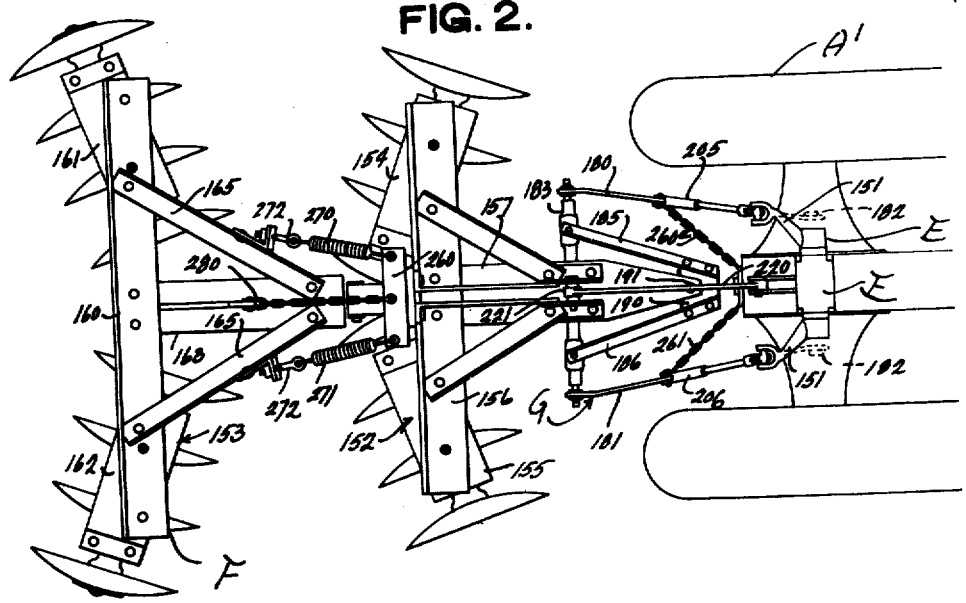
Figure 2 is a plan view of the details of the implement and tractor of Figure 1.

Flexible brace chains 260ᵃ and 261 may be connected to the rear end of the tractor frame and to the intermediate portions of the draw bars 180 and 181, as shown in Figure 2 of the drawings.

From the foregoing description of the invention it will be noted that an efficient type of draft connection has been provided for an agricultural or other implement to be drawn by the tractor which will enable the implement to operate with all of its flexibility and efficiency under normal circumstances. In addition, I have provided a lift mechanism which will enable the implement to be lifted or suspended clear of the ground, and to hold it in properly positioned and aligned relation. I am well aware that it has heretofore been proposed to lift implements at the rear of tractors by means of a variety of mechanisms, but none of them, so far as I am aware, will permit of the efficient and flexible operation of the implement, particularly such as are complicated, and still enable the same to be lifted and automatically swung into properly supported and aligned relation. The improved lift mechanism is particularly adaptable for use with multiple section disc harrows, since they are being more extensively used every day in cultivation and reclamation work, as well as in use of construction and highway projects.

Various changes in the shape, size and arrangement of parts may be made to the forms of invention herein shown and described, without departing from the spirit of the invention or the scope of the claims.

I claim:

1. In combination with a tractor, a power take-off, a pair of draw bar arms connected with the tractor at each side of the longitudinal axis thereof and extending rearwardly therefrom in divergent relation, a cross bar connected at the rear ends of said draw bars, and lift means connected with the power take-off of the tractor and intermediate the ends of said draw bars for lifting the latter upwardly and downwardly, and an implement having a slidable draw bar connection with said cross bar.

2. In an agricultural implement the combination of a front working section, a rear working section, means connecting said sections for flexible relative earth working movements, and means connected between said sections and free of direct connection with the tractor for vertically lifting and swinging the rearward section into proper position upon lifting of the forward section to a predetermined elevation.

3. In combination with a tractor, a power take-off for the tractor, a pair of draw bars connected with the tractor one at each side of the longitudinal axis of the tractor and extending rearwardly divergently therefrom, a cross bar connected at the rear ends of said draw bars, means connected with the power take-off and intermediate the ends of said draw bars for lifting the same, a pull arrangement connected with the cross bar and extending forwardly to a position between the cross bar and tractor, and an agricultural implement including a draw bar having connection with the forward part of said pull arrangement, the draw bar of said agricultural implement having a transverse slidable and non-tiltable connection upon said cross bar whereby upon elevation of the draw bars first mentioned the implement will be lifted with the cross bar into a suspended position.

4. In an agricultural implement the combination of a front working section, a rear working section, means positively connecting said sections for flexible relative earth working movement so that they may tilt from a horizontal plane angularly to each other and so that the rear section may swing laterally with respect to the front section, and springs connecting the front section with the rear section at each side of the longitudinal axes of the implements and which in relation to each other extend divergently rearwardly to their points of connection with the rear section, the same being of such nature that an elevation of the front implement will elevate and swing the rear implement section into alignment with the front section.

5. In an agricultural implement the combination of a front working section, a rear working section, means positively connecting said sections for flexible relative earth working movement so that they may tilt from a horizontal plane angularly with respect to the front section, a spring connecting the front section with the rear section at each side of the longitudinal axes of the implements and which springs in relation to each other extend divergently rearwardly to their points of connection with the rear section, the same being of such nature that an elevation of the front implement will elevate and swing the rear implement section into alignment with the front section, and means to limit the degree of extension of said springs as the rear implement is lifted by the front implement when the latter is elevated.

6. In combination with a tractor, a front agricultural implement having a draw bar connection with the tractor, a second and rear agricultural implement flexibly connected upon positive pivot axes with the front implement so that the second implement can move with a vertical tilting action relative to the front implement and with a horizontal lateral movement relative to the first implement, means for directly lifting the first implement off a ground surface from said tractor, and means connecting the front implement with the second implement so that the second implement will also be lifted at a predetermined elevation of the front implement.

7. In combination with a tractor, a power take-off upon the tractor, a draw bar mechanism connected with the tractor and extending rearwardly therefrom, means connecting the power take-off with the draw bar mechanism for lifting and lowering the rear end of the draw bar mechanism, an earth working implement, means connecting the earth working implement with the draw bar mechanism so that the earth working implement may have a longitudinal sliding action with respect to its connection with the draw bar mechanism, and brace means directly connecting the implement with the tractor so that upon lifting of the implement thru the draw bar mechanism, the said implement will be lifted vertically and maintained in substantially a horizontal position.

AUGUSTA POSTELLE McKAY.